Aug. 30, 1966     H. HERTEL ETAL     3,269,167

FORGING

Filed Aug. 2, 1963     5 Sheets-Sheet 3

*Inventors*
HEINRICH HERTEL
DIETRICH RUPPIN
BY
Burgess Dinklage & Sprung
ATTORNEYS Aug. 30, 1966 H. HERTEL ETAL 3,269,167
FORGING
Filed Aug. 2, 1963 5 Sheets-Sheet 4

Inventors
HEINRICH HERTEL
DIETRICH RUPPIN
BY
Burgess Dinklage & Sprung
ATTORNEYS Aug. 30, 1966  H. HERTEL ETAL  3,269,167
FORGING Filed Aug. 2, 1963  5 Sheets-Sheet 5

Inventors
HEINRICH HERTEL
DIETRICH RUPPIN
BY
Burgess Dinklage & Sprung
ATTORNEYS

3,269,167
FORGING

Heinrich Hertel and Dietrich Ruppin, Berlin, Germany, assignors to Dr. Heinrich Hertel, Berlin-Charlottenburg, Germany
Filed Aug. 2, 1963, Ser. No. 299,637
Claims priority, application Germany, Aug. 22, 1962, H 46,718
12 Claims. (Cl. 72—377)

The invention relates to a method of upsetting a metal structural component, such as a bar, a plate, a sheet, a tube, or any shape having a closed or open profile. It is basically applicable to all metal materials, such as steel, non-ferrous heavy metals, and, especially, light metal and their alloys, in spite of the differing formability of these materials.

The non-cutting methods of forming metal structural components consist of free-form forging, die forging or extruding. However, there are many upsetting operations that cannot be performed on structural components by these known methods. For the designer, nevertheless, it is very desirable to find a method of upsetting the extremities of long structural shapes, such as ribbed one-piece panels of high-strength metal alloys for aircraft construction, since he requires thickened portions at various points to provide sufficiently great cross-section to join the panels together. At the present time, such shapes or panels are made by extrusion, for example, in which they are given substantially thicker cross-sections over their entire length than are required for the design. The designer used the thick cross-sections only at the joint ends, while the extrusion has to be machined or etched down over the rest of its length to a substantially smaller cross-section. It is furthermore known that the methods developed for the manufacture of tapering shapes on extruding machines are hardly ever used in actual practice. To upset the extremity of a metal structural component of fairly large longitudinal dimensions in a die-forging press, openings would have to be provided at the press table to enable it to be passed in, and it would have to be mounted and fastened very tightly to the press table to receive the pressure of the ram. Such arrangements, however, would be very costly.

The invention is based upon the idea of upsetting such metal structural components through the force of a blow of high velocity in such a manner that the energy expended is used substantially only for the desired upsetting operation. The energy of a blow of high velocity can be produced in a known manner by means of a hammer or stamp driven, for example, by high-pressure steam, high-pressure gas or explosion gas, or also, and preferably, by means of an explosive charge.

According to the process of the invention, the upsetting of a metal structural component is performed by transmitting to the part of the component that is to be formed, the force of a blow of high velocity, preferably imparted by an explosive charge, concentrating it by means of a plate, the shaping being performed by the plate, and, if desired, the contour of a tool enveloping the portion being upset, and by surrounding, and preferably gripping or clamping the component beneath the portion that is to be upset with a bucking weight which is made so great that the applied force is substantially expended in the forming action.

Thus, the invention provides a process for forging an end of an elongated forgeable member which comprises placing the member in a forging tool which provides the end to be forged exposed for the forging thereof. A plate is placed in contact with the end to be forged, and the plate is of relatively large area with respect to the cross-sectional area of the end to be forged. Motion for the forging is imparted to the plate by expending kinetic energy against the plate to drive it against the end to be forged, and this motion of the plate effects the forging. A feature of the invention is the utilization of fluid kinetic energy for imparting the motion to the plate, and preferably this fluid kinetic energy is derived by explosion of an explosive charge.

The forging tool can include a bucking weight disposed adjacent the end to be forged for resisting the forging force. The bucking weight can be of sufficient mass so that the applied energy is expended substantially for the forging of the work piece. The bucking weight can be a stationary weight, and in such design, the weight should be of sufficient mass so that it can take up any force of the forging plate in excess of that utilized for the forging. Alternatively, the bucking weight can be of a mass such that it is stationary during the forging, and the mounting of the bucking weight can be such that energy in excess of that required and utilized in the forging, can be taken up by movement of the bucking weight. The movable bucking weight can be provided so that the bucking weight is fixedly connected to the work piece, and in such cases, upon the movement of the bucking weight, the work piece moves with it. Alternatively, the bucking weight can be mounted so that it is releasable with respect to the work piece, and so that the excess force over that utilized in forging is utilized to release the bucking weight from connection with the work piece and to impart movement thereto.

In a further embodiment of the invention, force in opposition to the forging force can be provided by imparting kinetic energy to the forging tool to urge movement thereof in a direction opposite to the movement of the plate. Preferably, this procedure is utilized to impart a force to the forging tool in opposition to the forging force of the plate, at the instant when the forging is complete so that the opposing force can be utilized to counteract excess energy of the forging plate. The kinetic energy imparted to the forging tool can be imparted thereto by an explosive charge, and the kinetic energy for forging and the kinetic energy for counteracting excess forging force can be proportioned as is appropriate in the circumstances with particular regard for the work being performed and the nature of the material.

The explosive charge can be a free charge, i.e., a charge laid up on the plate without a casing around the charge. The charge can, however, be a confined charge enclosed in a casing, and a confined charge may be preferred where it is desired to reduce noise or increase the force of the explosion directed against the end to be forged. Jacketed confining devices provided with water cooling can be used.

The explosive can be solid, plastic, or liquid, for example, pentrite, tetryl, trinitrotoluene, explosive gelatin, etc. The charge can be of various shapes, including cylindrical, conical, semi-spherical, and it can be a so-called hollow charge wherein concentration of the explosion is realized. Further, the charge can be a single piece charge or it can be of several spaced pieces.

Further features of the invention are described and explained with reference to the drawings, wherein.

In the various views of the drawings, like reference characters indicate corresponding parts.

Figure 1:
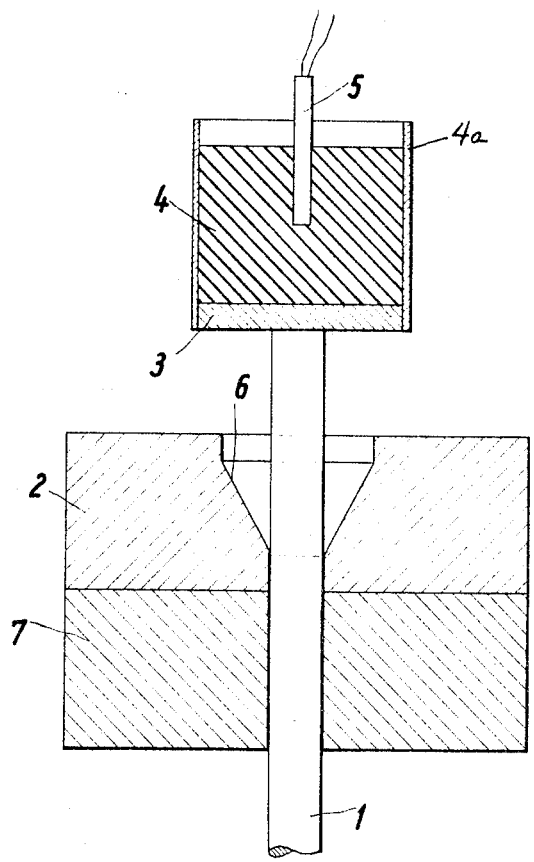
FIG. 1 shows schematically the process of upsetting a round bar made, for example, of light metal alloy, with the aid of an explosive charge.

In FIG. 1, the end of a round bar 1 is surrounded by a forging tool which includes the contour tool 2 and the bucking weight 7. The tool 2 can in general consist of steel. An explosive charge 4 is contained in a magazine 4a which can be paper, plastic, or metal. The force of an explosive charge 4 ignited by a detonator 5 is transmitted through a plate 3 to the end that is to be upset. The upset is shaped by the appropriate shaping of the sunken portion 6 of the tool 2 and of the surface of plate 3 facing the round bar 1.

The plate 3 is to receive the applied force over a relatively large area and transmit it to the relatively smaller cross-section of the structural component. This is especially important when the upsetting force is produced by an explosive charge, because for charges of equal weight, the shock impulse transmitted from the explosive to the structural component is augmented by approximately the plate diameter raised to the third power. Furthermore, the mass of plate 3 naturally affects the upsetting speed. However, a light plate 3 of large area can be rendered sufficiently rigid by ribbing it on the explosive charge side.

Figure 2:
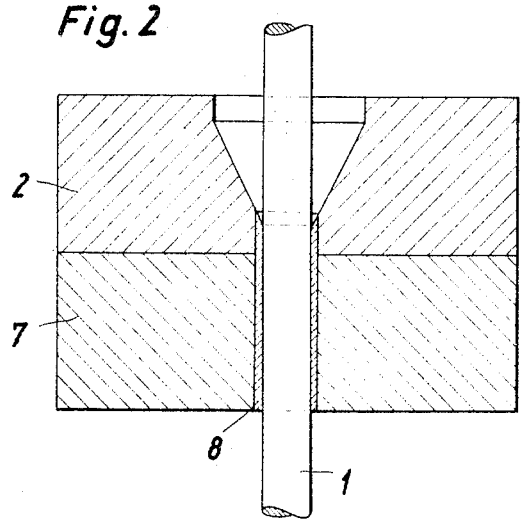
FIG. 2 shows additional means for the friction lock between the structural component and the bucking weight.

Then the force of a blow of high velocity, of, let us say, 200 meters per second, is transmitted in concentrated fashion by plate 3 to the portion of round bar 1 that is to be upset, the shock energy is substantially expended and consumed in the upsetting; nevertheless, a small amount of energy goes to accelerate the bar in the direction of its axis. The axial displacement of the bar and upsetting over more than the desired length are prevented by surrounding the bar, and preferably by clutching it or clamping it, immediately behind the desired upset with a bucking weight 7. The tight clamping of bar 1 in the bucking weight 7 is unnecessary if the bar is made of a very easily formable material, because in that case the bar swells in the area of the loosely fitting bucking weight so rapidly and strongly that the bar automatically seizes in the bucking weight. However, an adequate thrust lock between the round bar 1 and the bucking weight 7 can be assured, for example, by melting an easily fusible substance, especially a metal of low-melting alloy, and using it to fill the air gap between bar 1 and bucking weight 7, this filling being indicated by the number 8 in FIG. 2. The filling 8 can be of a low melting alloy which will solder with the workpiece and the die. It can be a lead-tin alloy. For steel dies where the workpiece is of the iron group, a brazing solder can be used. Low melting point alloys which do not bond to the workpiece can also be used and can function by reason of their plasticity as fillers. Bonding of the filler to the workpiece or die can be prevented by using parting agents.

Figure 3:
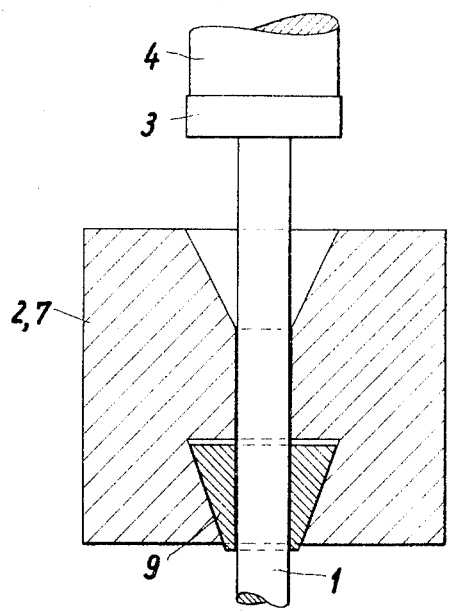
FIG. 3 shows an embodiment in which the tool and the bucking weight consist of one piece, with additional means for a good thrust lock between the round bar and the bucking weight.

The bucking weight 7 may consist of any desired material, providing it be suited, on the basis of its physical properties, for damping the force of the explosive charge. In general, however, the bucking weight will also be made of steel, and it is, of course, possible in this case for the tool 2 and the bucking weight 7 to consist of one piece as shown in FIG. 3, wherein the forging tool 27 performs the function of both the tool 2 and the bucking tool 7 in FIG. 1. FIG. 3 also shows that a good thrust lock between round bar 1 and forging tool 27 can be achieved by wedge-shaped inserts, as for example the gripping cone 9, in the correspondingly shaped internal contour of the bucking weight. The cone 9 can be formed of three or four pieces to provide jaws which operate to give a gripping action.

FIGS. 4 to 9 illustrate the production of the desired contours in the upset on bar 1 by the appropriate formation of the surface of plate 3 facing the portion to be upset and of tool 27 which is made in one piece with the bucking weight.

Figure 4:
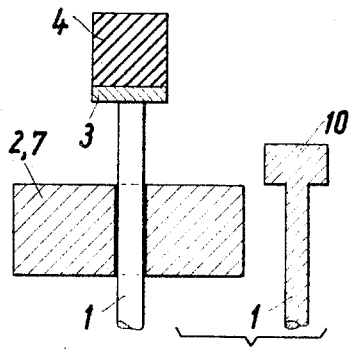
FIGS. 4 to 9 show schematically the construction of the plate and of the tool made in one piece with the bucking weight for the formation of desired contours in the upsetting of a round bar and the upsets thus produced.

In FIG. 4, the contour of the upset 10 on bar 1 is formed by a flat surface on plate 3 facing the upset, and by the surface of tool 27 facing the plate.

Figure 5:
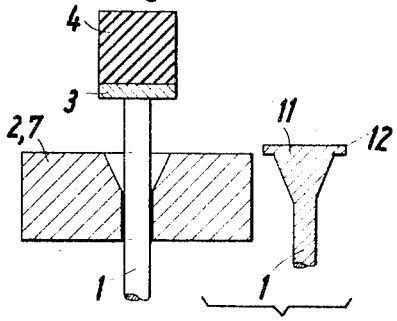

The upset 11 on bar 1, which is equipped with flanges 12, in FIG. 5, is achieved by the fact that the opening in tool 27 is somewhat smaller than the breadth of plate 3.

Figure 6:
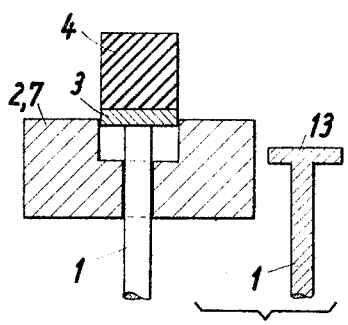

The T-shaped upset 13 on bar 1 in FIG. 6 can be formed by causing the flat-faced plate 3 to enter into a tool 27 having a recess of rectangular cross-section.

Figure 7:
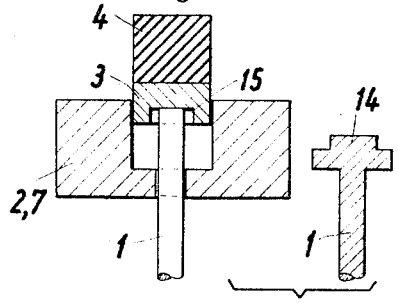

The shape of the head of the T-shaped upset 14 on bar 1 in FIG. 7 is formed, in variation of the embodiment in FIG. 6, by providing a recess 15 in plate 3.

Figure 8:
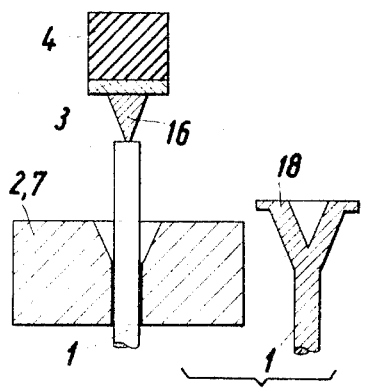
Figure 9:
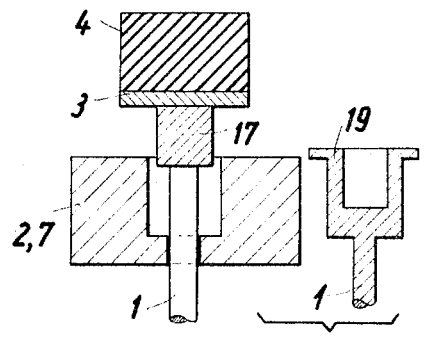

If the upset head is to be slotted or forked or is in any other way to be hollowed, plate 3 is provided with sharp points 16 or blunt point 17, so that the upsets 18 or 19 are produced, for example, as in FIGS. 8 and 9, respectively.

Figure 10:
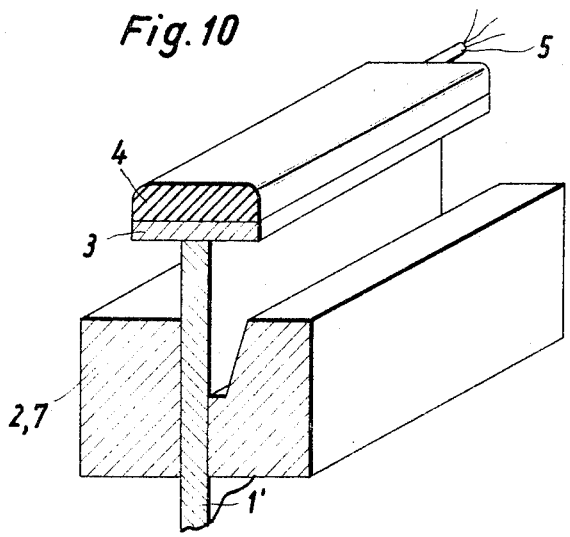
FIG. 10 shows the upsetting of an edge of sheet metal.

The upsetting of the edge of a metal plate 1' is shown in FIG. 10, which requires no further explanation.

The examples given with reference to FIGS. 4 to 10 show that upsets can be produced on workpieces in any desired form by the appropriate shaping of forging tool 27 and of the surface of plate 3 facing the portion of the workpiece that is to be upset. The upsetting can be done not merely at one end of the structural component, but also at another point or at as many other points as desired.

To increase its formability, the portion of the structural component that is to be upset can be preheated in known fashion, as by inductive or radiant heating.

Since the force of the upsetting blow may not be entirely consumed in the forming of the workpiece, and the latter may be accelerated as a result, a portion of the force of the blow must, as described, be absorbed by the bucking weight or forging tool, which can be then set in movement in the direction of the axis of the upset component or round bar, for example. Therefore, additional means can be provided for damping the applied force of the blow of high velocity after the upsetting has been performed. A rigid axial supporting of the component of the member being forged in back of the bucking weight would have the disadvantage that the latter would act as a hammer and produce undesired deformations such as kinks in long, round bars.

Figure 11:
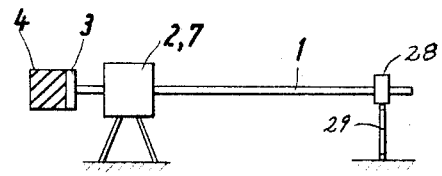

If rigid support of the structural component, such as a round bar 1, is considered necessary, it must be provided at the forging tool 27, as illustrated in FIG. 11, wherein the forging tool is rigidly mounted and the member 1 is supported at the end not forged by being received loosely in holder 28, which is mounted on an upright 29, so that it is movable to prevent restraining of axial movement of the member 1.

However, a movable mounting is to be preferred, it being possible to absorb the forces and movements in the axial direction especially by means of one of the three following systems.

Figure 12:
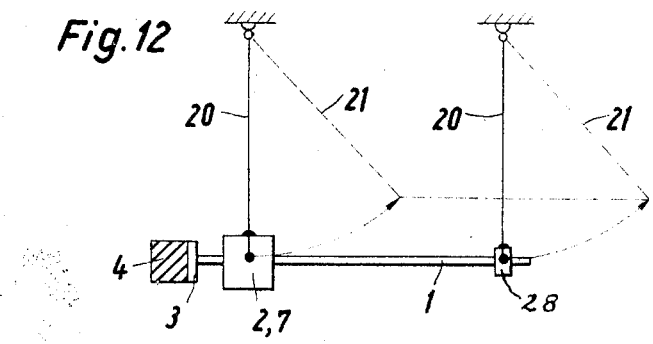

As shown in FIG. 12, forging tool 27 and the holder 28 are mounted on a pendulum system 20, and the workpiece such as a round bar, is mounted in the forging tool and holder. The shock of the upsetting blow can be absorbed by the swinging of the pendulum. The upsetting blow, such as the charge 4, may however, also be produced when the pendulum 20, after being released from a certain height 21, reaches the dead center position, the energy from the fall and total mass being approximately equal and opposite to the energy of the blow that is not used up in the upsetting action, so that the swinging system is halted at the bottom dead center point by the energy of the upsetting blow.

Figure 13:
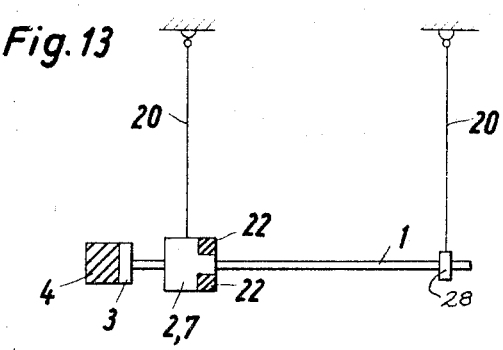

Referring to FIG. 13, an explosive charge 22 can be applied to the rear side of the forging tool 27, the firing of the charge 22 opposing the movement produced by the upsetting blow. This system can be associated with a pendent arrangement of the structural part and the bucking weight. Desirably, the charge 22 is exploded at the time at which the forging is just completed.

Figure 15:
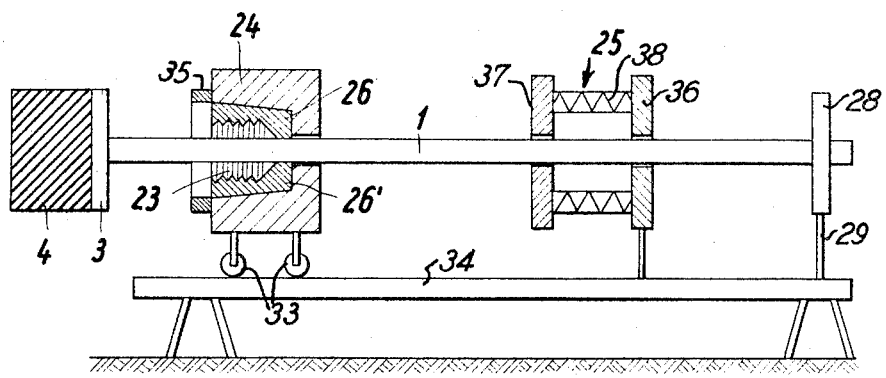
FIGS. 11 to 15 illustrate further means for the damping of the applied energy of the high-velocity blow after the upsetting has been done.
Figure 14:
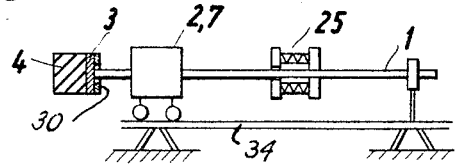

A preferred form of apparatus for practice of the invention is depicted in FIG. 14 and FIG. 15. This apparatus comprises a bucking weight having an aperture extending therethrough for receiving therein the elongated member with the end thereof to be forged, exposed for the forging. The apparatus further includes a contour tool which is disposed within the bucking weight, and, similar to the bucking weight, the contour tool has an aperture extending therethrough for receiving therein the elongated member and also providing the end of the elongated member exposed for forging. The bucking member is releasably secured to the contour member, and the contour member is adapted for fixed connection to the workpiece for holding the workpiece against the forging force. Also included in the apparatus is a forging plate for transmitting energy utilized for the forging to the end of the elongated member or workpiece which is to be forged. Characteristic of the apparatus is means responsive to movement of the plate and for releasing the bucking weight from connection with the contour weight upon completion of the forging, whereby energy in excess of that utilized in forging is dissipated by releasing and imparting motion to the bucking weight.

As illustrated in FIG. 14, the excess energy of the upsetting blow afeer the conclusion of the desired upsetting action can be used to strip a movably mounted bucking weight rearwardly away from the workpiece 1. This action takes place if the remaining shock energy is transmitted by means of plate 3 to the bucking weight in a manner to release the bucking weight. The ring 30 is provided to facilitate the release. This type of system is better illustrated in FIG. 15.

Referring to FIG. 15, the workpiece 1 extends through an aperture in the bucking weight 24 and the contour tool 26. The bucking weight and the contour tool together form a forging tool, and this forging tool is mounted on wheels 33 which run on track 34. The bucking weight 24 is releasably mounted on the contour tool 26 so that durig the forging step, the bucking weight remains secured to the contour tool but can be released therefrom upon an impact of the bucking weight.

The workpiece 1 is secured to the contour weight 26 in any suitable manner, for example, the means described hereinbefore for the securing of a forging tool to the workpiece.

The forging tool is further provided with a ring member 35, and this ring member is mounted for engagement by the plate 3 at the conclusion of the forging step, and so that force received thereby from the plate 3 will be transmitted to the bucking weight 24, for release of the bucking weight from the contour tool 26. Upon release of the bucking weight from the contour tool, the bucking weight moves axially over the track 34 until it engages the bumper 25 which includes the mounting plate 36, engagement plate 37, and the spring 38 provided for consuming the force of impact between the bucking weight and the bumper 25. Holder 28 serves to restrain movement of the workpiece 1 to facilitate release of the contour tool 26.

Figure 16:
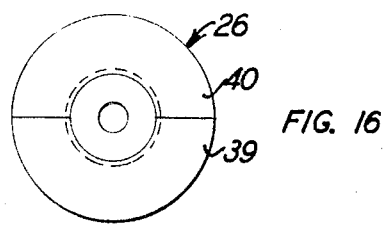
FIG. 16 is an end elevation view of a part of the apparatus shown in FIG. 15.

The contour tool 26 can be formed of two or more radial sections, as indicated in FIG. 16, FIG. 16 being a front elevation view of the contour tool 26. Thus, the contour tool 26 is formed of the semi-circular radial segments 39 and 40. Being formed of radial segments, the contour tool can be conveniently removed from the forged end following axial movement of the bucking weight from the contour tool, as the contour tool will then be freed of the forged end, and will therefore drop from the forged end or can be removed following breaking of the seal provided to fixedly mount the contour tool on the working element. In the embodiment illustrated, the contour tool is provided with threads 23 for the forming of a threaded piece from the workpiece.

The relationship of the cross-sectional area of the end of the workpiece contacted by the plate and the surface area of the plate which contacts the workpiece depends on the particular task performed. In general, it will be in the range of 1:2 to 1:40. For small size workpieces, it will be, generally, 1:8 to 1:40 and for large size workpieces, generally, 1:2 to 1:8.

As is indicated in the drawings, in particular in FIG. 1, it is not necessary that there be a guide to influence the movement of the plate, though, as is apparent from FIG. 7, a guide can be used.

*Example*

An extruded bar of unalloyed metallurgical aluminum with a degree of purity of 99.5 to 99.7% and with the customary impurities of iron and silicon was used to forge a piece to the form shown in FIG. 5. The bar-length is 1000 mm., the bar diameter is 20 mm. The forging was done at room temperature and no preheating was utilized. The material of the bucking mass consists of normal structural steel (German Norm St 37 K). This possesses a tensile strength of 50 kp./mm.$^2$ The weight of the bucking mass amounts to 7.6 kp. The clamping of the workpiece 1 takes place mechanically at the divided bucking mass 7 and at the clamping-cone 9. subdivided into 4 cheeks (jaws) according to FIG. 3. The undivided die 2 is placed loose on the bucking mass 7. It consists of high-grade structural steel (German Norm St 60). This possesses a tensile strength of 65 kp./mm.$^2$. The material of the circular impact plate is normal structural steel. The plate diameter amounts to 80 mm., the plate thickness to 12 mm.

The specifications for the explosive are as follows:

Explosive: Ammon-Gelit 3
Form of charging: Cylinder
Quantity of charge: 120 g.
Ignition geometry: As in FIG. 1
Detonating cap (5): No. 8 of the German Norm
Type of ignition: Electrical with bridge igniter.

The bar was disposed vertically with its free end projecting into fine grained loose sand to provide a simple absorption system for the excess energy, so that damage to the rod could not occur.

What is claimed is:

1. The process of forging an end of an elongated forgeable member to change the shape of said end while leaving the shape of the body of the member unchanged, which comprises:
   (a) placing the member in a forging tool providing said end exposed for forging thereof, said forging tool comprising a bucking weight disposed adjacent the end to be forged;
   (b) placing a plate in operative connection with said end for forging of said end upon movement of the plate toward said end, the plate being of relatively large area with respect to the cross-sectional area of said end;
   (c) imparting motion to the plate by expending kinetic energy provided by explosion of an explosive charge against the plate to drive it toward the said end, said motion of the plate forging the end of the elongated member while leaving the shape of the body of the member unchanged.

2. The process of claim 1, wherein the elongated member is held substantially stationary by the bucking weight during the forging thereof, and energy of the plate in excess of that used in the forging is expended by utilization thereof to impart movement to the bucking member.

3. The process of claim 1, wherein the elongated member is held substantially stationary by the bucking weight during the forging thereof, and energy of the plate in excess of that used in the forging is expended by utilization thereof to impart movement together to the bucking member and the elongated member.

4. The process of claim 1, wherein the elongated member is held substantially stationary by the bucking weight during the forging thereof, and energy of the plate in excess of that used in the forging is expended by utilization thereof to impart movement to the bucking member relative to the elongated member.

5. The process of claim 1, wherein the bucking weight is substantially stationary and is in engagement with the said elongated member for holding the elongated member substantially stationary during the forging.

6. A process according to claim 1, wherein the plate is guided in its forging motion solely by the expended kinetic energy and its contact with the end to be forged.

7. The process of claim 1, wherein the forging tool has a die cavity complementary to the shape of said forged end, and forging said end into the die cavity by said kinetic energy to impart thereto the shape of the forged end.

8. The process of claim 1, wherein a force opposing the forging force is imparted to the forging tool by expending kinetic energy against the forging tool whereby resistance to the forging force is provided.

9. Process according to claim 8, wherein the force opposing the forging force is imparted to the forging tool to counteract energy of the plate in excess of that utilized for the forging.

10. The process of forging an end of an elongated forgeable member to change the shape of said end while leaving the shape of the body of the member unchanged, which comprises:
  (a) placing the member in a forging tool providing said end exposed for forging thereof, said forging tool comprising a bucking weight disposed adjacent the end to be forged;
  (b) fixedly connecting the bucking weight to the elongated member by providing a melt of fusible material between the elongated member and the bucking weight and allowing the melt to solidify so that it is bonded to the enlongated member and to the bucking weight;
  (c) placing a plate in operative connection with said end for forging of said end upon movement of the plate toward said end, the plate being of relatively large area with respect to the cross-sectional area of said end;
  (d) imparting motion to the plate by expending kinetic energy provided by explosion of an explosive charge against the plate to drive it toward the said end, said motion of the plate forging the end of the elongated member while leaving the shape of the body of the member unchanged.

11. The process of forging an end of an elongated forgeable member to change the shape of said end while leaving the shape of the body of the member unchanged, which comprises:
  (a) placing the member in a forging tool suspended by a pendulum system providing said end exposed for forging thereof;
  (b) dropping the forging tool carrying the elongated member from an elevated position of said system;
  (c) placing a plate of relatively large area with respect to the cross-sectional area of said end for operative connection with said end for forging of said end upon movement of the plate toward said end, at bottom dead center of a path of said end in said system;
  (d) imparting motion to the plate upon said operative connection of the elongated member with the plate by expending kinetic energy provided by explosion of an explosive charge against the plate to drive it toward the said end, said motion of the plate forging the end of the elongated member while leaving the shape of the body of the member unchanged.

12. The process of forging an end of an elongated forgeable member to change the shape of said end while leaving the shape of the body of the member unchanged, which comprises:
  (a) holding the elongated member in a forging tool with the end to be forged disposed on one side of the tool and a portion thereof disposed on the other side of the tool;
  (b) placing a plate in operative connection with the end to be forged for forging of said end upon movement of the plate toward said end, the plate being of relatively large area with respect to the cross-sectional area of the elongated member;
  (c) imparting motion to the plate by expending kinetic energy provided by explosion of an explosive charge against the plate to drive it toward the said end, said motion of the plate forging the end of the elongated member while leaving the shape of the body of the member unchanged;
  (d) restraining the elongated member from movement in response to the forging force by said holding thereof by the forging tool, while said portion of the elongated member disposed on the other side of the forging tool is unrestrained with respect to the forging force.

References Cited by the Examiner

UNITED STATES PATENTS

| | | | |
|---|---|---|---|
| 400,148 | 3/1889 | Webster | 78—62 |
| 1,613,595 | 1/1927 | Abel | 29—552.4 |
| 2,023,042 | 12/1935 | Brennan | 78—62 |
| 2,278,293 | 3/1942 | Watson | 78—62 |
| 2,878,562 | 3/1959 | Bruce | 29—552.4 |
| 2,947,063 | 8/1960 | Teeple | 29—421 |
| 2,948,923 | 8/1960 | Rocca | 18—16.5 |

FOREIGN PATENTS 502,597  3/1939  Great Britain.

CHARLES W. LANHAM, *Primary Examiner.*

G. P. CROSBY, *Assistant Examiner.*